UNITED STATES PATENT OFFICE.

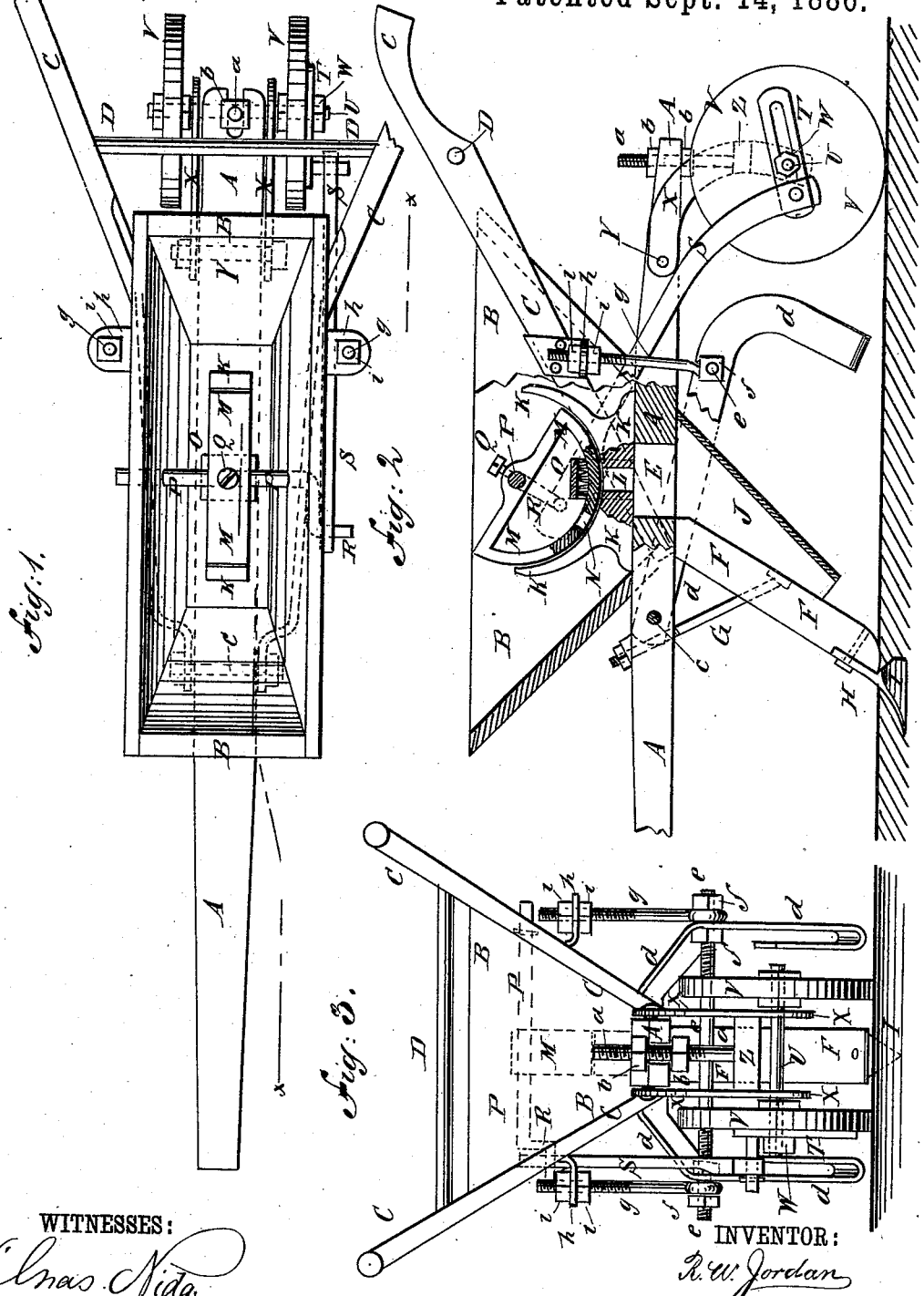

ROBERT WATSON JORDAN, OF MOUNT STERLING, ALABAMA.

CORN-PLANTER.

SPECIFICATION forming part of Letters Patent No. 349,162, dated September 14, 1886.

Application filed November 7, 1885. Serial No. 182,110. (No model.)

*To all whom it may concern:*

Be it known that I, ROBERT WATSON JORDAN, of Mount Sterling, in the county of Choctaw and State of Alabama, have invented a new and useful Improvement in Corn-Planters, of which the following is a full, clear, and exact description.

Reference is to be had to the accompanying drawings, forming a part of this specification, in which similar letters of reference indicate corresponding parts in all the figures.

Figure 1 is a plan view of my improved planter, part being broken away. Fig. 2 is a side elevation of the same, partly in section, through the line $x\ x$, Fig. 1, and part being broken away. Fig. 3 is a rear elevation of the same.

The object of this invention is to provide corn-planters constructed in such a manner that the seed will be dropped with certainty, and which can be readily adjusted to work deeper or shallower in the ground.

The invention consists in the construction and combination of various parts of the corn-planter, as will be hereinafter fully described.

A represents the plow-beam, to the upper side of which, at a little distance from its rear end, is attached the hopper B. To the opposite sides of the hopper B are attached the forward ends of the handles C, the rear parts of which are connected by a round, D.

In the beam A, beneath the middle part of the hopper B, is formed a slot, E, through which the seed drops. To the lower side of the beam A, at the forward end of the discharge-slot E, is attached the upper end of the standard F, which is strengthened against the draft-strain by the inclined brace G, attached to it and to the beam A.

To the lower end of the standard F is attached the plow H, to open a channel to receive the seed. The plow H is made in the form of a scooter or shovel-plow with a solid base or foot, I, upon the lower side of its forward end. The foot I is made V-shaped in its cross-section, as shown in dotted lines in Fig. 3, so as to pack the sides of the furrow and leave the said furrow V-shaped, so that the kernels of grain will slide down the inclined sides of the said furrow and lie in a line in its bottom. The grain is conducted from the slot E in the beam A into the channel opened by the plow H I by the spout J, placed at the rear side of the standard F, and attached to the said standard and to the beam A.

To the upper side of the beam A, within the hopper B, is attached, by screws or bolts, the stationary part K of the seed-dropping mechanism, which is made narrower than the interior of the lower part of the said hopper, has an opening, L, through its center for the passage of seed, and has a semi-cylindrical recess in its upper side. Into the semi-cylindrical recess of the part K is fitted the upper part, M, which is made in the form of a semi-cylindrical band connected at its ends by a cross-bar. In the center of the semi-cylindrical band of the upper part, M, is formed an aperture, N, of such a size as to contain so much seed as is required to be dropped for a hill.

O is a brush placed above the band of the upper part, M, of the seed-dropping mechanism and directly over the aperture L in the lower part, K, of the said mechanism. The ends of the brush O are bent downward and are attached to the sides of the lower part, K. With this construction, as the upper part, M, is vibrated, the aperture N passes out from beneath the brush O, receives seed, and carries it in beneath the said brush, when it drops through the apertures L E and the spout J to the ground.

The center of the cross-bar of the part M is perforated to receive the shaft P, and is secured to the said shaft by a set-screw, Q, or other suitable means, so that the said part M will be vibrated by the rocking of the said shaft P. The shaft P is journaled in bearings in the sides of the hopper B, and to one of its ends is attached, or upon it is formed, a crank, R, to which is pivoted the forward end of a pitman, S. The other end of the pitman S is pivoted to a crank-arm, T, which is slotted longitudinally to receive the ends of the axle U of the wheels V, where it is secured in place by a nut, W. The slot in the crank-arm T allows the said crank-arm to be adjusted to give a longer or a shorter stroke to the pitman S, and a longer or a shorter throw to the vibrating upper part, M, of the seed-dropping mechanism, according as two or one seed-receiving holes be formed in the said part. The wheels V are rigidly attached to the axles U, and the axle U revolves in bearings in the rear ends of the downwardly-curved bars X, the forward ends of which are pivoted by a bolt, Y, to the opposite sides of the beam A, at a little distance from the rear end of the said beam. The rear parts of the curved bars X are rigidly connected by a bar, Z, to the center of which is secured the lower end of the screw $a$. The screw $a$ passes up through a slot in the rear end of the beam A, and has nuts $b$ screwed upon it above and below the said beam, so that by adjusting the said nuts the wheels V can be raised and lowered, to cause the plows to work deeper or shallower in the ground.

To the opposite sides of the beam A, a little in front of the hopper B, is pivoted by a bolt, $c$, the forward ends of the plow-beams $d$, the rear parts of which are curved downward, and are slotted to receive the bolts that fasten covering-plows or a covering-board, either or both, to the said beams.

$e$ is a connecting-rod having screw-threads upon its ends, which ends pass through holes in the rear parts of the plow-beams $d$, and have nuts $f$ screwed upon them, upon the opposite sides of the said beams, so that the said beams can be adjusted farther apart or closer together by adjusting the said nuts. The ends of the rod $e$ also pass through the eyes of the eye-screws $g$, which pass through brackets $h$, secured to the sides of the hopper B, or to the handles C, and have nuts $i$ screwed upon them above and below the said brackets, so that the plow-beams $d$ can be raised and lowered to cause the covering-plows to work deeper or shallower in the ground by adjusting the said nuts $i$.

If desired, the seed-dropping mechanism can be detached and replaced by a mechanism for distributing cotton-seed or a fertilizer, the other parts of the mechanism being unchanged.

Having thus fully described my invention, I claim as new and desire to secure by Letters Patent—

1. In a corn-planter, the combination, with a beam having an aperture therein, a hopper on the same having a concave seat provided with an aperture registering with the aperture in the beam, and drive-wheels at the rear end of the beam, of a semi-cylindrical feeder secured to a crank-shaft journaled in the hopper, an adjustable crank on the axle of the drive-wheels, and a pitman connected to said crank-arms, substantially as herein shown and described.

2. In a corn-planter, the combination, with the beam A, the hopper B, and the wheels V, secured to the rear end of the beam, of the crank-shaft P, journaled in the hopper, the semi-cylindrical part M, attached to the shaft P, the slotted crank-arm T on the axle of wheels V, and the pitman S, connected to crank of the shaft P and to the crank T, substantially as herein shown and described.

3. In a corn-planter, the combination, with the hopper B, the beam A, and the plow-beams $d$, of the screw-rod $e$ and its nuts, the eye-screws $g$ and their nuts, and the brackets $h$, substantially as herein shown and described, whereby the covering-plows can be readily adjusted laterally and vertically, as set forth.

4. In a corn-planter, the channel-opening plows H, formed with a solid V-shaped base or foot, I, substantially as herein shown and described, whereby a V-shaped channel will be opened to receive the seed, as set forth.

ROBT. WATSON JORDAN.

Witnesses:
O. C. ULMER,
M. L. YEATMAN.